Oct. 25, 1949.   J. O. JACKSON   2,486,287
SEALING MEANS FOR THE JOINTS BETWEEN THE MOVABLE AND
STATIONARY WALLS OF AN ADJUSTABLE WIND TUNNEL NOZZLE
Filed March 13, 1947   3 Sheets-Sheet 2

INVENTOR
James O. Jackson
By Green, McCallister & Miller
His ATTORNEYS

Oct. 25, 1949.  J. O. JACKSON  2,486,287
SEALING MEANS FOR THE JOINTS BETWEEN THE MOVABLE AND
STATIONARY WALLS OF AN ADJUSTABLE WIND TUNNEL NOZZLE
Filed March 13, 1947  3 Sheets-Sheet 3

INVENTOR
James O. Jackson
By Green, McCallister & Miller
His ATTORNEYS

Patented Oct. 25, 1949

2,486,287

UNITED STATES PATENT OFFICE 2,486,287

SEALING MEANS FOR THE JOINTS BETWEEN THE MOVABLE AND STATIONARY WALLS OF AN ADJUSTABLE WIND TUNNEL NOZZLE

James O. Jackson, Crafton, Pa., assignor to Pittsburgh-Des Moines Company, a corporation of Pennsylvania Application March 13, 1947, Serial No. 734,518

6 Claims. (Cl. 138—45)

This invention relates to a portion or section, such as the adjustable nozzle of a supersonic wind tunnel, having fixed and movable walls, and particularly to means for sealing the joints between such fixed and movable walls.

A wind tunnel adjustable nozzle comprises four walls, two of which are fixed and two of which are movable. The inner faces of the fixed walls which are flat and smooth are arranged in spaced parallel planes. The movable walls are arranged between such fixed walls and are movable toward and from the longitudinal axis of the nozzle passage defined by such fixed and movable walls.

The movable walls of the nozzle section, which section is located ahead of, or upstream from the test section, are arranged to be longitudinally flexed to different contours for the purpose of obtaining in the test section the desired air speed and, because such movable walls are thus flexed, sealing of the joints between the movable and fixed walls becomes a problem.

One object of this invention is to produce efficient means for sealing the joints between the movable and fixed walls of an adjustable nozzle or duct for a wind tunnel.

Another object is to produce an improved fluid pressure expansible seal for the joint between a movable and a fixed wall of a wind tunnel section or portion.

A further object is to produce an improved fluid expansible seal for the joint between two relatively movable walls of a wind tunnel section structure.

A further object is to produce fluid pressure expansible means for sealing the joints between the longitudinally flexible walls and the fixed walls of an adjustable nozzle for a supersonic wind tunnel.

These and other objects I attain by means of the structure disclosed in the specification and illustrated in the drawings accompanying and forming part of this application.

Figure 1:
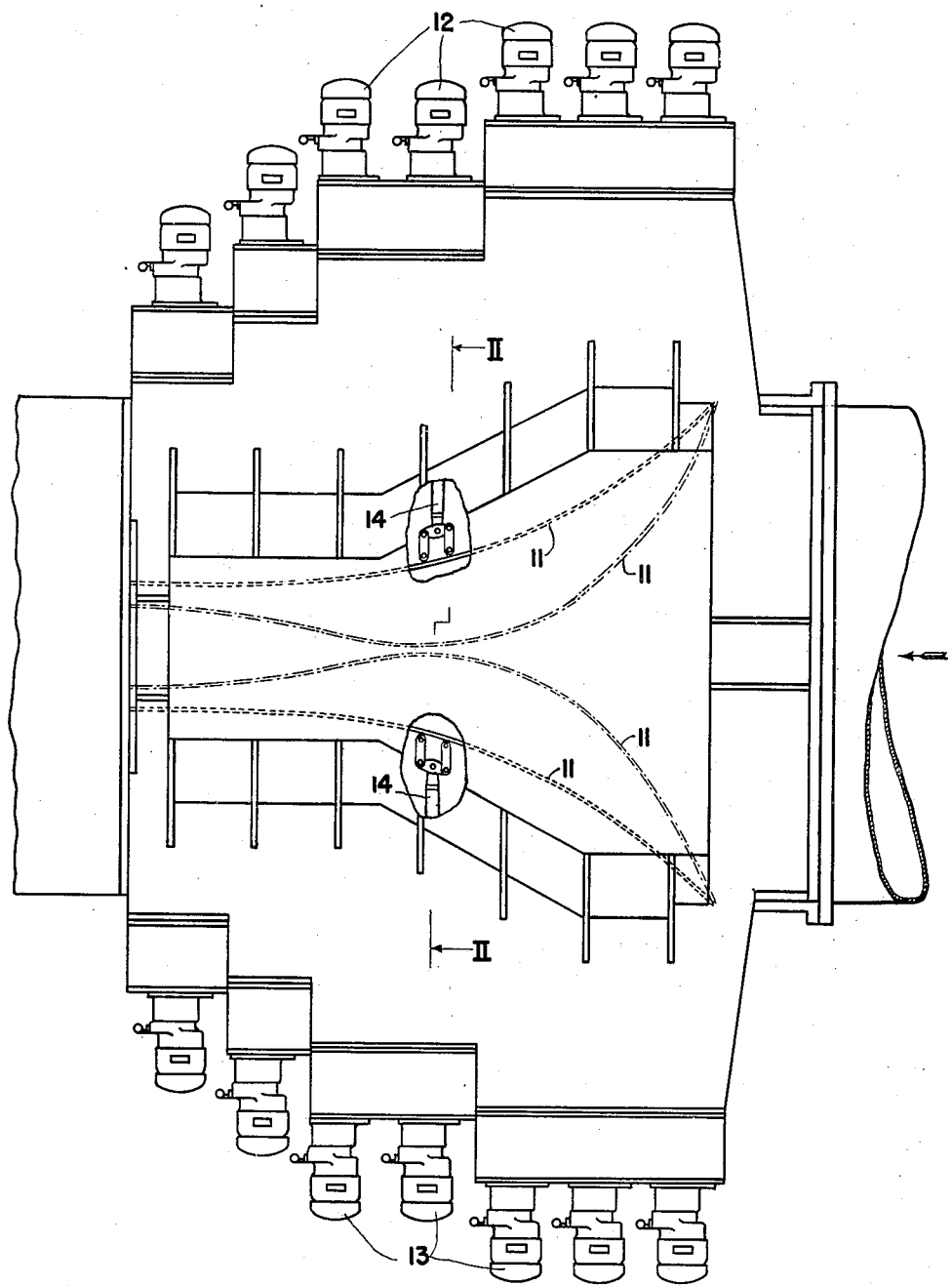
Figure 1 is a fragmentary portion of a wind tunnel and includes an adjustable nozzle section in which the invention of this application is embodied.
Figure 3:
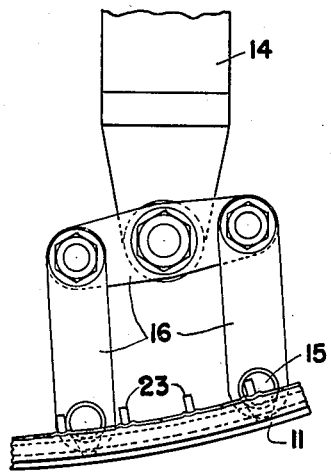
Fig. 3 is a view taken on line III—III of Fig. 2.
Figure 2:
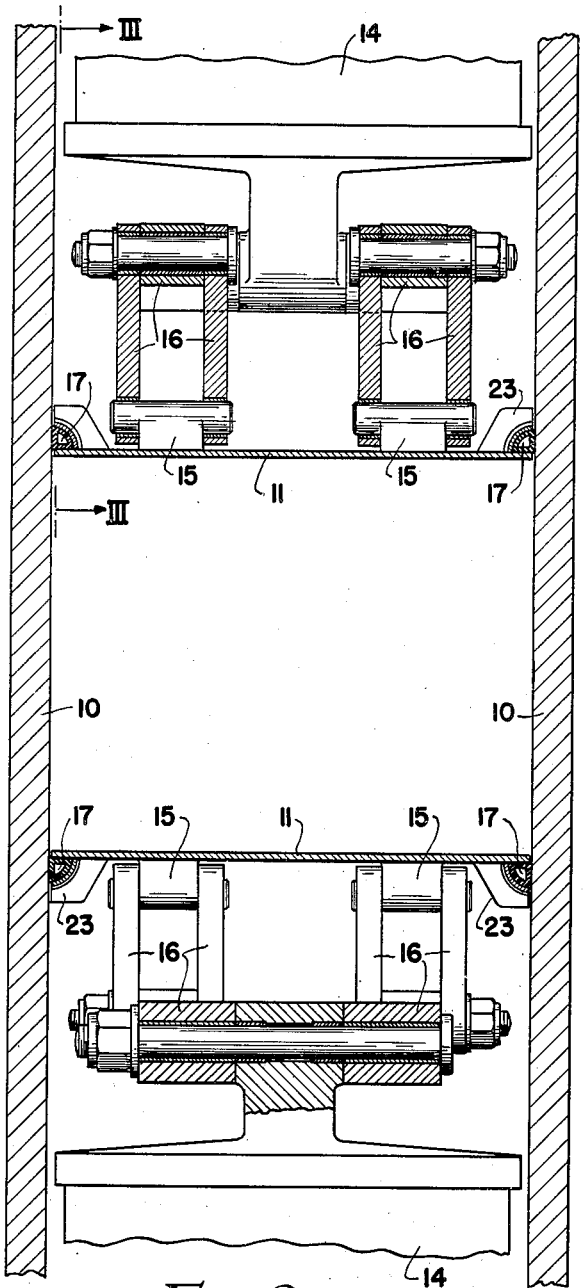
Fig. 2 is a fragmentary transverse section of such nozzle section and is taken on line II—II of Fig. 1.
Figure 10:
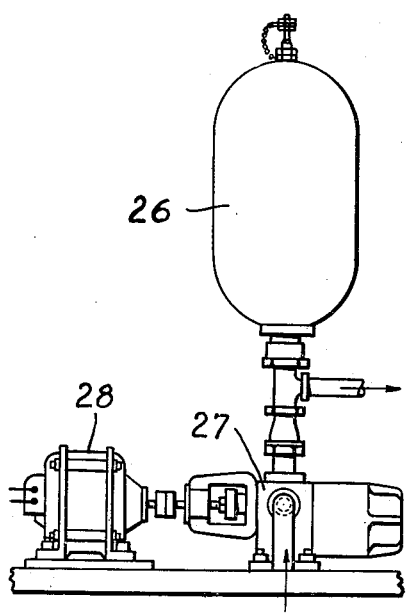
Fig. 10 is a more or less diagrammatic illustration of an accumulator, an air pump and a motor for driving such pump.

The fixed side walls of the nozzle section are numbered 10 and the movable walls which are arranged in spaced relation between the fixed walls are numbered 11 and comprise relatively thin steel plates capable of being longitudinally flexed as disclosed by dot and dash lines in Fig. 1, in order that the contour of the nozzle passage may be changed for the purpose of obtaining the desired air speed in the test section of the tunnel which is located immediately downstream from the nozzle section.

Walls 11 are arranged to be simultaneously and similarly flexed by means of a number of motor operated screw jacks, the upper jacks being numbered 12 and the lower jacks 13. Members 14 of the screw jacks (two only being shown) are connected by means of a series of links 16 to spaced lugs 15 which are secured to or formed as unitary parts of the movable walls 11.

The longitudinal edges of the movable walls 11 have a relatively close fit with the inner faces of the stationary walls and each of the four joints between the movable and stationary walls is sealed by a hollow flexible pressurized sealing agent 17.

These sealing agents are made from rubber or a rubber-like material which will slide on but will not adhere to the smooth inner surfaces of the fixed walls. The sealing agents are located adjacent the longitudinal edges of the movable walls and extend throughout the length of such walls.

Each agent 17, in cross section, resembles a hollow quarter round, one flat face of which is adapted to bear on the outer face of a movable wall, while the other flat face is adapted to bear on the inner face of a fixed wall. One end of each agent is closed, while the opposite end is provided with a three-way valve (not shown), by means of which air under pressure may be supplied from accumulator 26 to agents 17.

Accumulator 26 is supplied with air under pressure by an air pump 27 operated by an electric motor 28. The accumulator is preferably maintained at a pressure such that the air pressure within agents 17 is always in excess of any pressure encountered in the nozzle passage.

Agents 17 are backed by segmental metal members the inner faces of which conform to the curved side of such agents. The segments of the backing members are arranged in end to end relation and extend throughout the length of the sealing agents.

The backing members are held in place by anchor members which are secured to the outer face of the movable walls at spaced positions therealong.

The segmental backing members form flexible retaining walls for the hollow sealing agents.

Three forms of segmental backing members are disclosed in the drawings. In the form shown in Figs. 2, 3, 4 and 5, the ends of the segments 18 of the backing members are scarfed as shown at 19 so that the ends of adjacent segments overlap. Each segment 18 midway between its ends is provided with two parallel corrugations 20 which are so formed and spaced apart as to provide a central depression 21 having a curved face adapted to engage curved face 22 of its anchor members 23. This structure forms a continuous retaining wall capable of flexing longitudinally as movable wall 11 is flexed longitudinally.

Figure 4:
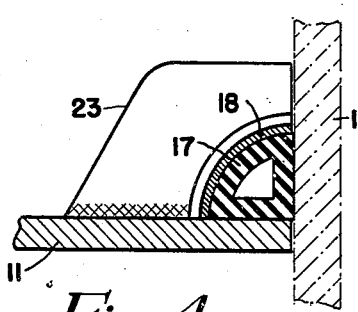
Fig. 4 is a sectional view of portions of a fixed and a movable wall of such wind tunnel section, with the joint between such walls sealed by one form of device embodying this invention. This view is taken on line IV—IV of Fig. 5.
Figure 5:
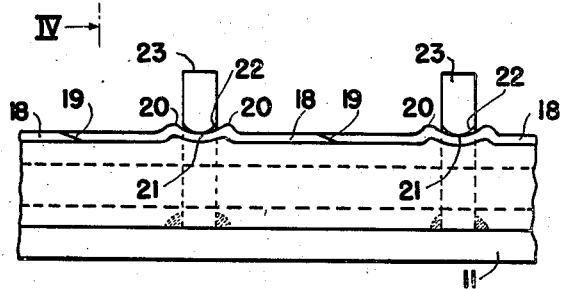
Fig. 5 is an elevational view of the sealing means of this invention looking toward the adjacent edge of the movable wall of Fig. 4.
Figure 6:
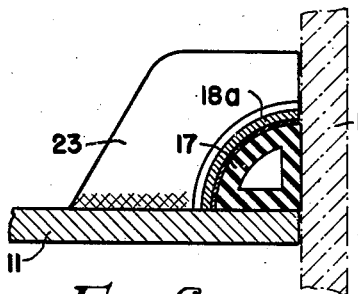
Fig. 6 is a view similar to Fig. 4, is taken on line VI—VI of Fig. 7 and discloses a modified form of the sealing means of this invention.
Figure 7:
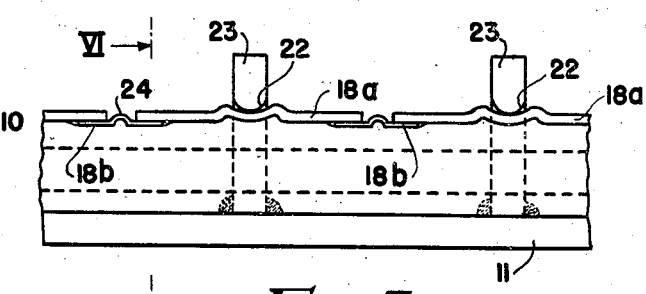
Fig. 7 is a view similar to Fig. 5 of such modified form.

In the form shown in Figs. 6 and 7, the segments 18a of the backing members are the same as segments 18 of Figs. 4 and 5 except that they are shorter and their ends are spaced apart and not scarfed. A supplemental segment 18b underlies the adjacent ends of segments 18a and such supplemental segments are provided with a central corrugation 24 which projects outwardly between the adjacent ends of adjacent segments 18a and hold the supplemental segments in place. This structure also forms a continuous retaining wall capable of flexing longitudinally as movable wall 11 is flexed longitudinally.

Figure 8:
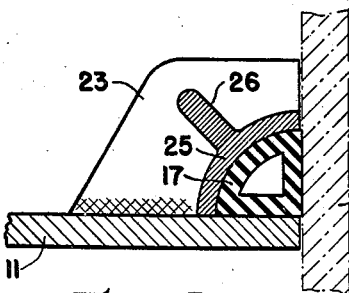
Fig. 8 is a view similar to Figs. 4 and 6 of still another modified form.
Figure 9:
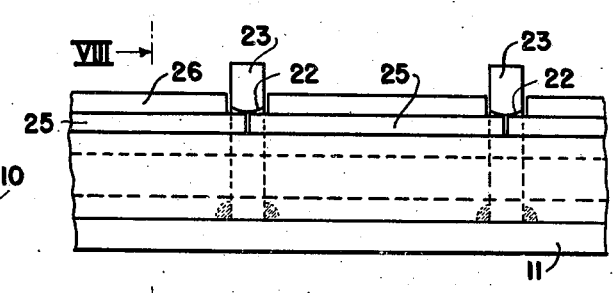
Fig. 9 is a view similar to Figs. 5 and 7 of the modified form of Fig. 8.

In the form shown in Figs. 8 and 9, the segments 25 of the backing members are slightly spaced apart and the adjacent ends of the segments 25 are located below curved face 22 of anchor members 23. Each segment 25 is provided with a wing 26, the ends of which terminate short of anchor members 23, and are provided for the purpose of limiting longitudinal movement of segments 25 to prevent them from moving out from under anchor members 23.

What I claim is:

1. In combination with a pair of spaced fixed walls, a pair of spaced movable walls located between such fixed walls and with the same defining an elastic fluid nozzle or duct of rectangular cross section, seals carried by such movable walls on their outer side adjacent the longitudinal edges thereof for sealing the joints between such movable and fixed walls; each such seal comprising a hollow pressure expansible agent which when expanded, bears against the outer side of a movable wall and the inner side of a fixed wall, metal backing means for each such agent, anchor members secured to the outer face of the movable wall adjacent such agent and arranged at intervals throughout the length of such agent for holding such backing means in place and means for supplying air under pressure to the interior of such hollow agents to expand the same into sealing contact with both the movable and fixed walls.

2. A structure as defined in claim 1, in which the movable walls are capable of being longitudinally flexed to vary the cross sectional area of such nozzle or duct, and in which the means holding each expansible agent in place is formed in sections arranged in end to end relation throughout the length of such expansible agent in order to accommodate such longitudinal flexing.

3. In combination with a pair of spaced fixed walls the inner faces of which are arranged in parallel planes, a pair of spaced movable walls located between such fixed walls and with the same defining an adjustable elastic fluid nozzle or duct of rectangular cross section, and means for sealing the joints between such fixed and movable walls; each such means comprising a hollow pressure expansible agent extending along an outer side of one such movable wall adjacent a longitudinal edge thereof; segmental backing means for each such agent, means spaced longitudinally of such movable walls for anchoring such backing means in place and means for supplying air under pressure to the interior of such agents to expand the same into sealing contact with the outer faces of such movable walls and the inner faces of such fixed walls.

4. A structure as defined in claim 3, in which the segmental backing means comprises a number of relatively movable members arranged in end to end relation.

5. A structure as defined in claim 4, in which each of the relatively movable members comprised in the segmental backing means has its expansible agent contact face formed on a circular arc of substantially 90°.

6. A structure as defined in claim 1, in which each of the pressure expansible agents has the form of a hollow quarter round, one flat face of which is adapted to bear on a movable wall and the other on a fixed wall.

JAMES O. JACKSON.

REFERENCES CITED

The following references are of record in the file of this patent:

UNITED STATES PATENTS

| Number | Name | Date |
|---|---|---|
| 1,095,767 | Adams | May 5, 1914 |
| 1,439,452 | Shaw | Dec. 19, 1922 |
| 1,951,034 | Norton | Mar. 13, 1934 |
| 1,966,202 | Pfefferle | July 10, 1934 |
| 2,424,654 | Gamble | July 29, 1947 |